(12) United States Patent
Murphy

(10) Patent No.: US 8,544,623 B1
(45) Date of Patent: Oct. 1, 2013

(54) CORD ORGANIZING SYSTEM FOR HAIR SHEARS

(76) Inventor: Ramon R. Murphy, Grand Blanc, MI (US)

( * ) Notice: Subject to any disclaimer, the term of this patent is extended or adjusted under 35 U.S.C. 154(b) by 2 days.

(21) Appl. No.: 13/242,939

(22) Filed: Sep. 23, 2011

(51) Int. Cl.
*H02G 11/02* (2006.01)
(52) U.S. Cl.
USPC ............................................... 191/12.4
(58) Field of Classification Search
USPC ................. 191/12 R, 12.2 R, 12.4; 24/115 R
See application file for complete search history.

(56) References Cited

U.S. PATENT DOCUMENTS

| | | | |
|---|---|---|---|
| 2,306,611 A * | 12/1942 | Benjamin | 191/12.2 R |
| 5,379,903 A * | 1/1995 | Smith | 211/26 |
| D355,889 S | 2/1995 | Salvati et al. | |
| 5,547,393 A | 8/1996 | Jansen | |
| 5,701,981 A | 12/1997 | Marshall et al. | |
| 6,095,156 A * | 8/2000 | Smith, II | 132/286 |
| 6,331,121 B1 * | 12/2001 | Raeford, Sr. | 439/501 |
| 6,591,952 B1 * | 7/2003 | Randall | 191/12.4 |
| 6,969,275 B1 | 11/2005 | Brock | |
| 7,513,361 B1 | 4/2009 | Mills, Jr. | |
| D608,945 S | 1/2010 | Coleman et al. | |

* cited by examiner

*Primary Examiner* — R. J. McCarry, Jr.
*Assistant Examiner* — Jean Charleston

(57) ABSTRACT

An organizing system for an electrical clipper having a housing with side walls, a top and bottom surface, and an inner cavity, the top surface is removably attached to a side wall via an attachment means, a spring-loaded cord spool in the inner cavity having an axle around which a cord of a clipper can be wrapped and rotates to wind or unwind the cord, a bottom end of the axle removably engages a spool mounting component in the bottom surface of the housing, a cord slot allowing a cord of a clipper to penetrate the housing in a side wall, a release button on a top end of the axle protrudes through a hole in the top surface and is pressed to wind the cord of the clipper, and a power strip in the inner cavity of the housing has a cord that protrudes through the housing.

9 Claims, 5 Drawing Sheets

TOP VIEW

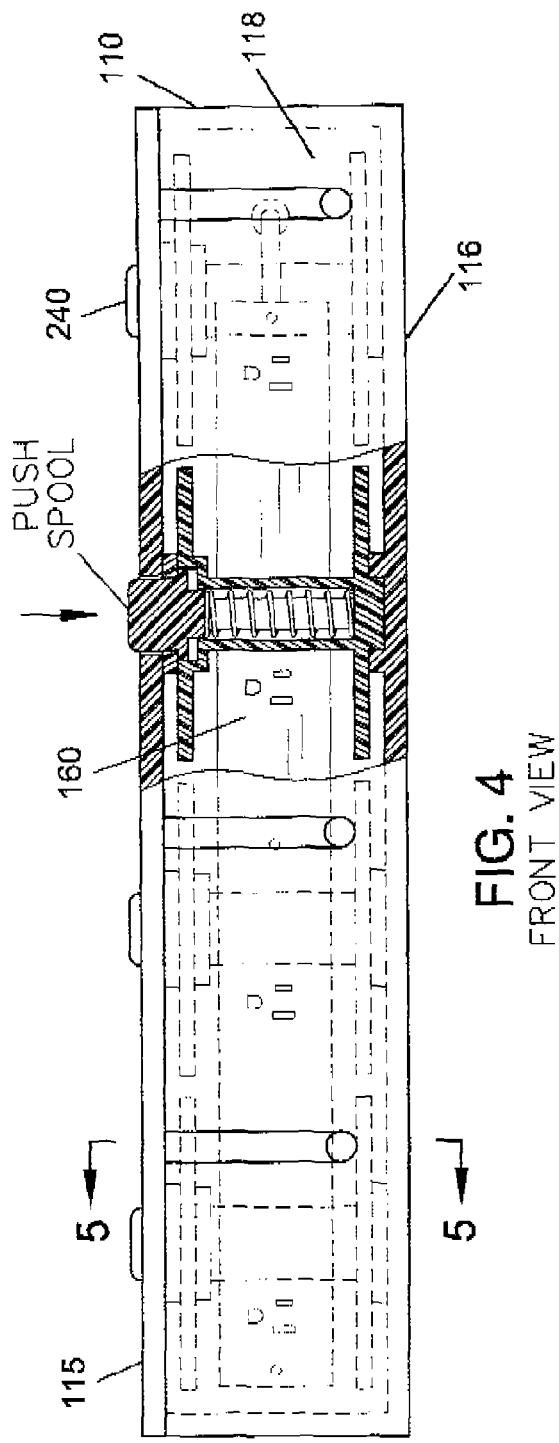
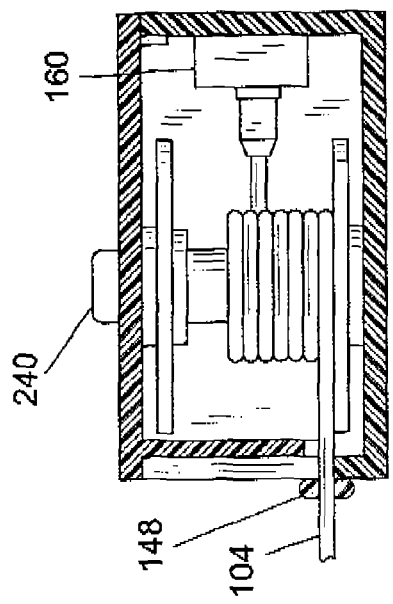

ALT. EMBODIMENT CLAMP VERSION

CORD ORGANIZING SYSTEM FOR HAIR SHEARS

FIELD OF THE INVENTION

The present invention is directed to a system for organizing cords for electric appliances such as hair cutting clippers and shears.

BACKGROUND OF THE INVENTION

Barbers may find themselves having to untangle cords for clippers, shears, and other hair cutting/styling equipment. The present invention features a cord organizing system for organizing and neatly storing cords. The system of the present invention can help time and prevent tripping hazards.

SUMMARY

The present invention features a cord organizing system for hair shears. In some embodiments, the organizing system for an electrical clipper comprises a housing having side walls, a top surface, a bottom surface, and an inner cavity, the top surface is removably attached to at least one side wall via an attachment means; a spring-loaded cord spool disposed in the inner cavity of the housing, the spring-loaded cord spool comprises an axle around which a cord of a clipper can be wrapped, a bottom end of the axle removably engages a spool mounting component disposed in the bottom surface of the housing, the spring-loaded cord spool can rotate in a first direction winding the cord and a second direction unwinding the cord; a cord slot disposed in a first side wail of the housing, the cord slot extends from a top edge of the first side wall downwardly toward the bottom surface of the housing, the cord slot allows a cord of a clipper to penetrate the housing; a release button is disposed on a top end of the axle of the spring-loaded cord spool, when the release button is pressed the spring-loaded cord spool rotates in the first direction so as to wind the cord of the clipper; a button hole disposed in the top surface of the housing, the button hole is aligned with the release button of the spring-loaded cord spool, the release button protrudes through the button hole; and a power strip disposed in the inner cavity of the housing, the power strip has a power strip cord that protrudes through the housing.

In some embodiments, the attachment means comprises a snap mechanism, a clip mechanism, a magnet mechanism, a latch mechanism, a hinge mechanism, or a combination thereof. In some embodiments, the system further comprises mounting holes disposed in the bottom surface of the housing, the mounting holes allow the housing to be secured to a surface. In some embodiments, the system further comprises a clamp disposed on the housing, the clamp allows the housing to be secured to a structure.

In some embodiments, the system comprises two spring-loaded cord spools. In some embodiments, the system comprises three spring-loaded cord spools. In some embodiments, the system comprises four spring-loaded cord spools. In some embodiments, the system further comprises a sanitizer box having an open top, an inner cavity of the sanitizer box is adapted to hold a clipper head of a clipper.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 is a front view of the system of the present invention.

FIG. 5 is a side view of the system of the present invention.

DESCRIPTION OF PREFERRED EMBODIMENTS

Referring now to FIG. 1-6, the present invention features an organizing system 100 for cords of clippers, shears, and other hair cutting/styling equipment. Electrical clippers are well known to one of ordinary skill in the art. The clippers 105 each comprise a clipper head 105a, a cord 104, and a plug head disposed at the end of the cord 104.

Figure 2:
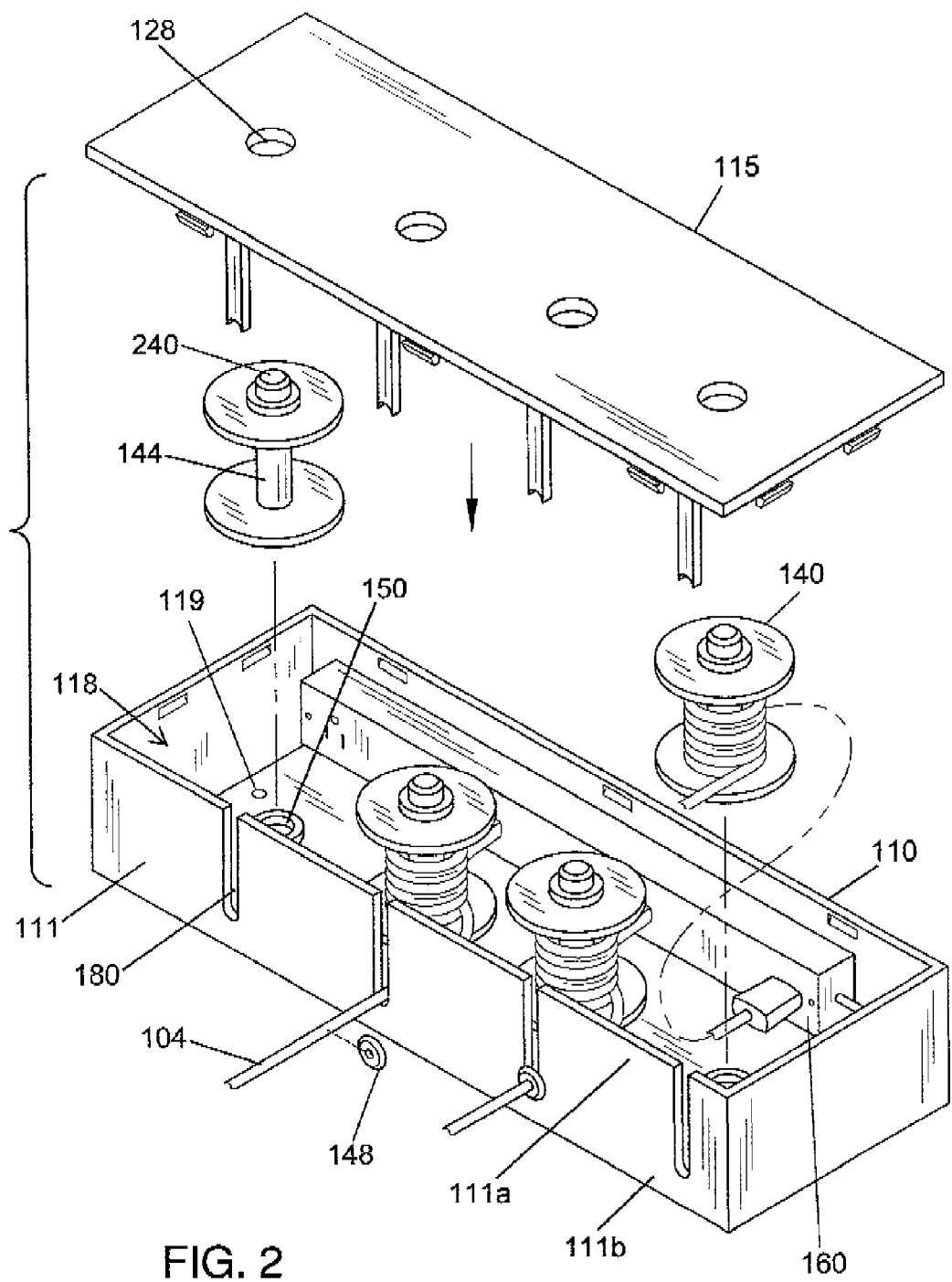
FIG. 2 is an exploded view of the system of the present invention.
Figure 3:
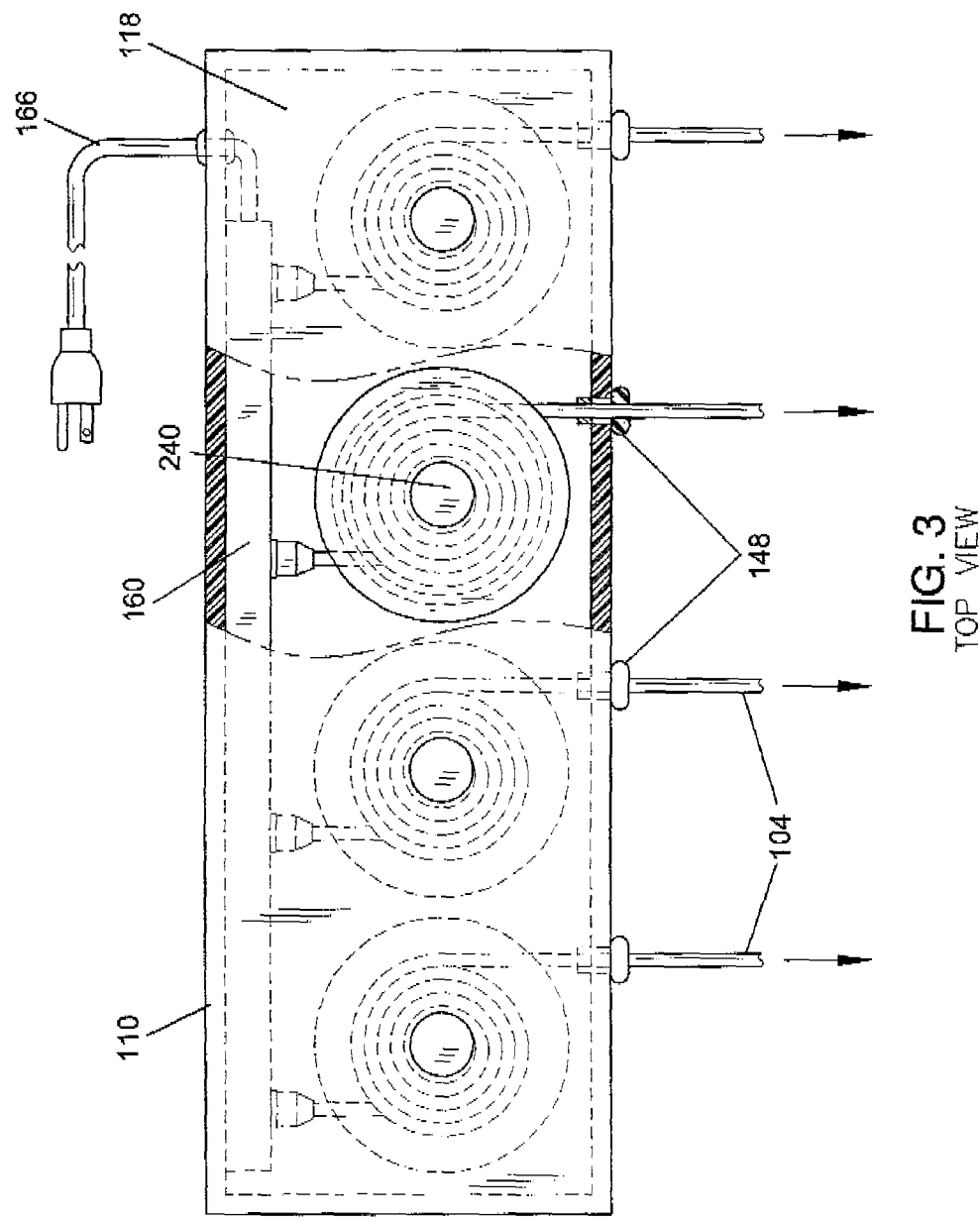
FIG. 3 is a top view of the system of the present invention.

The system 100 of the present invention comprises a housing 110 having a first side wall 111, a top surface 115, a bottom surface 118, and an inner cavity 118. As shown in FIG. 2, the top surface 115 is removably attached to the side walls (e.g., the first side wall 111, etc.) via an attachment means. In some embodiments, the attachment means comprises a snap mechanism, a clip mechanism, a magnet mechanism, a latch mechanism, a hinge mechanism, the like, or a combination thereof. The attachment means is not limited to the aforementioned mechanisms.

Disposed in the inner cavity 118 of the housing 110 are one or more spring-loaded cord spools 140. In some embodiments, two spring-loaded cord spools 140 are disposed in the housing 110. In some embodiments, three spring-loaded cord spools 140 are disposed in the housing 110. In some embodiments, four spring-loaded cord spools 140 are disposed in the housing 110. In some embodiments, more than four spring-loaded cord spools 140 are disposed in the housing 110. Spring-loaded spools are well known to one of ordinary skill in the art. The spring-loaded cord spools 140 each have an axle 144, which is positioned perpendicularly to the bottom surface 116 of the housing 110 and extends upwardly from the bottom surface 116 of the housing 110. The axles 144 are adapted to accept cords 104 of clippers 105 (e.g., a cord 104 of a clipper 105 wraps around an axle 144). The bottom ends of each axle 144 engages (e.g., removably) a spool mounting component 150 disposed in the bottom surface 116 of the housing 110.

One or more cord slots 180 are disposed in the first side wall 111 of the housing 110. The cord slots 180 extend from the top edge 111a of the first side wall 111 downwardly toward (or to) the bottom edge 111b of the first side wall 111. The cord slots 180 are adapted to allow the cords 104 of the clippers 105 to penetrate through the housing.

The cords 104 can be wound and unwound on the spools 140. In some embodiments, a cord stop 148 is disposed on the cord 104 to limit the amount the cord 104 can be wound. Cord stops are well known to one of ordinary skill in the art.

A release button 240 is disposed on each top end of the axles 144 of the spools 140. The release button 240 can be pressed so as to cause the spools 140 to rotate, thereby winding the cords 104 around the axles 144. Release buttons for spring-loaded spools are well known to one of ordinary skill in the art.

One or more buttons holes 128 are disposed in the top surface 115 of the housing 110. The button holes 128 are aligned with the release buttons 240 of the spools 140, and the release buttons 240 protrude through the button holes 128 (e.g., see FIG. 4, FIG. 5).

A power strip 160 (e.g., surge protector power strip) is disposed in the inner cavity 118 of the housing 110. Power strips 160 are well known to one of ordinary skill in the art. The plug heads of the cords 104 of the clippers 105 can be inserted into outlets in the power strip 160. The power strip 160 has a power strip cord 166 that penetrates through the housing 110. The power strip cord 166 can be operatively connected to an electrical outlet.

Figure 6:
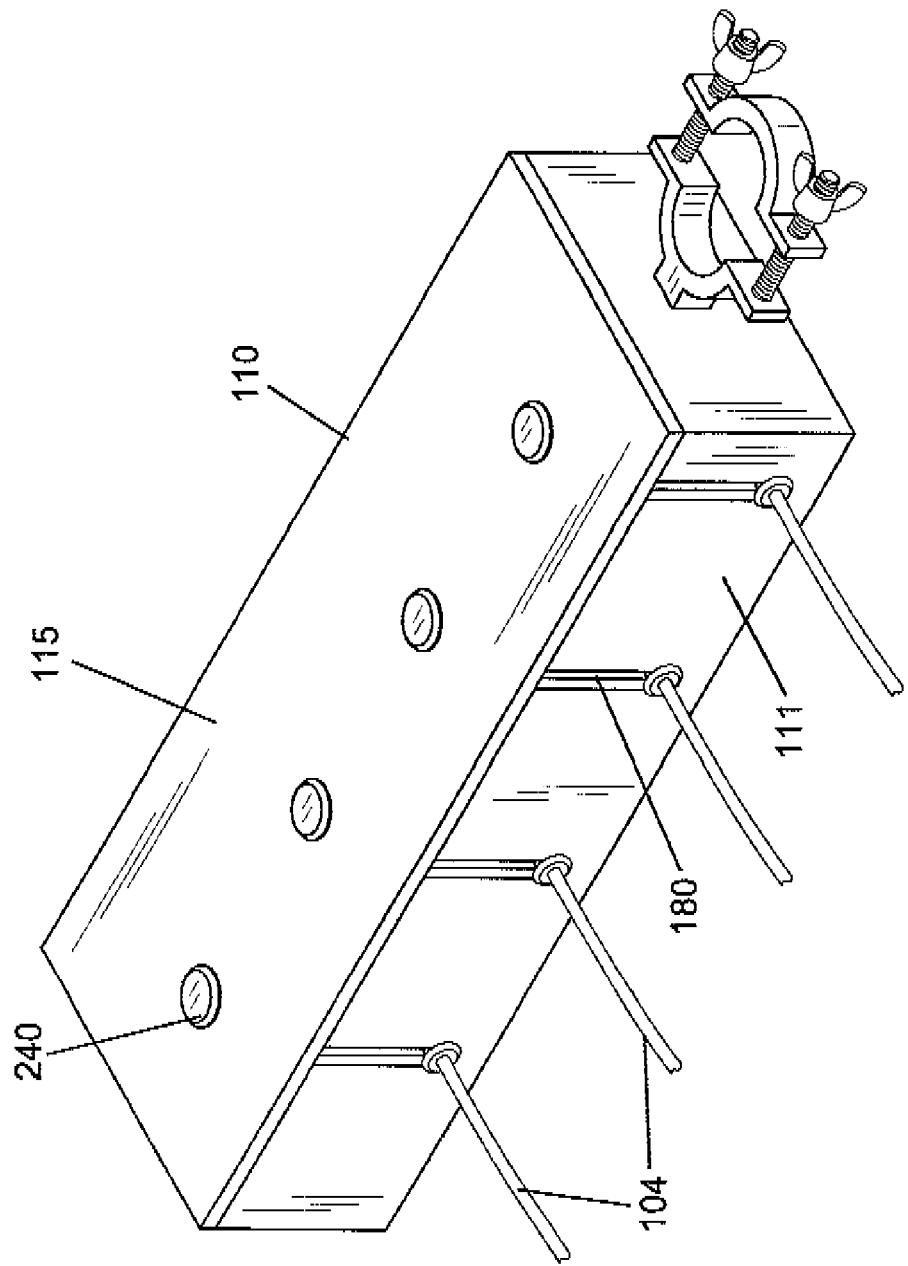
FIG. 6 is a perspective view of an alternative embodiment of the system of the present invention.

In some embodiments, the housing 110 can be mounted to a surface, for example a work table, a wall, a floor, etc. In some embodiments, mounting holes 119 are disposed in the bottom surface 116 of the housing 110, wherein the mounting holes 119 are adapted to accept screws, bolts, and the like. The mounting holes allow the housing 110 to be screwed, nailed, or bolted to the surface. As shown in FIG. 6, in some embodiments, a clamp 119a is disposed on the housing 110 (e.g., a side wall or other location), wherein the clamp 119a allows the housing 110 to be secured to a structure including but not limited to a pole or post.

Figure 1:
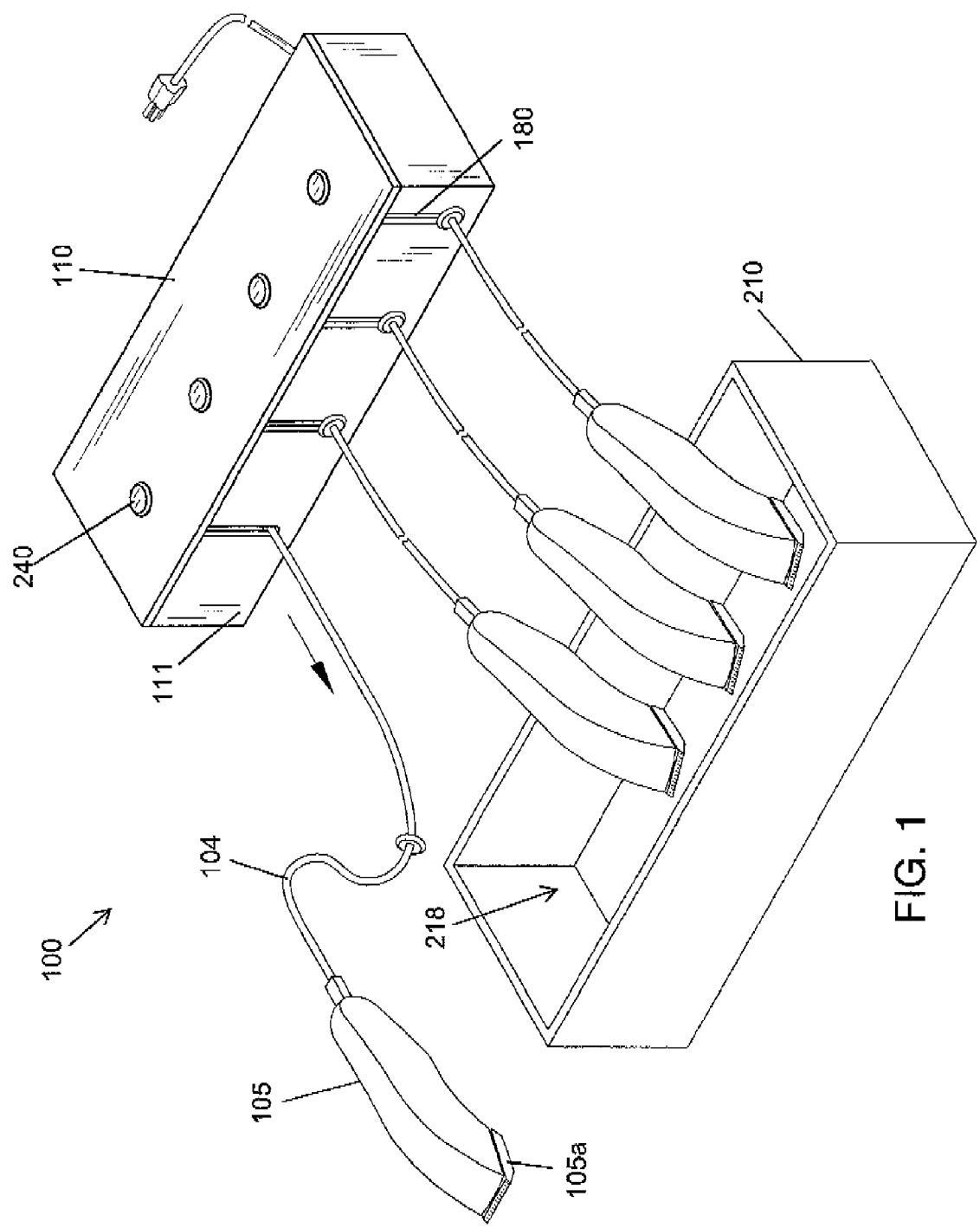
FIG. 1 is a perspective view of the system of the present invention.

The system 100 further comprises a sanitizer box 210 having an open top. As shown in FIG. 1, the inner cavity 216 of the sanitizer box 210 is adapted to hold multiple hair clipper heads 105a.

The disclosures of the following U.S. Patents are incorporated in their entirety by reference herein: U.S. Pat. No. 5,379,903; U.S. Design Pat. No. D355,889; U.S. Pat. No. 5,547,393; U.S. Pat. No. 5,701,981; U.S. Pat. No. 6,095,156; U.S. Pat. No. 6,331,121; U.S. Pat. No. 6,591,952; U.S. Pat. No. 6,969,275; U.S. Pat. No. 7,513,361; U.S. Design Pat. No. D608,945.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An organizing system 100 for an electrical clipper 105, said system 100 comprising:
   (a) a housing 110 having side walls, a top surface 115, a bottom surface 116, and an inner cavity 118, the top surface 115 is removably attached to at least one side wall via an attachment means;
   (b) a spring-loaded cord spool 140 disposed in the inner cavity 118 of the housing 110, the spring-loaded cord spool 140 comprises an axle 114 around which a cord 104 of a clipper 105 can be wrapped, a bottom end of the axle 114 removably engages a spool mounting component 150 disposed in the bottom surface 116 of the housing 110, the spring-loaded cord spool 140 can rotate in a first direction winding the cord 104 and a second direction unwinding the cord 105;
   (c) a cord slot 180 disposed in a first side wall 111 of the housing 110, the cord slot 180 extends from a top edge 111a of the first side wall 111 downwardly toward the bottom surface 116 of the housing 110, the cord slot 180 allows a cord 104 of a clipper 105 to penetrate the housing 110;
   (d) a release button 240 is disposed on a top end of the axle 144 of the spring-loaded cord spool 140, when the release button 240 is pressed the spring-loaded cord spool 140 rotates in the first direction so as to wind the cord 104 of the clipper 105;
   (e) a button hole 128 disposed in the top surface 115 of the housing 110, the button hole 128 is aligned with the release button 240 of the spring-loaded cord spool 140, the release button 240 protrudes through the button hole 128; and
   (f) a power strip 160 disposed in the inner cavity 118 of the housing, the power strip 160 has a power strip cord 166 that protrudes through the housing 110.

2. The system 100 of claim 1, wherein the attachment means comprises a snap mechanism, a clip mechanism, a magnet mechanism, a latch mechanism, a hinge mechanism, or a combination thereof.

3. The system 100 of claim 1 further comprising mounting holes 119 disposed in the bottom surface 116 of the housing 110, the mounting holes allow the housing 110 to be secured to a surface.

4. The system 100 of claim 1 further comprising a clamp 119a disposed on the housing, the clamp 119a allows the housing 110 to be secured to a structure.

5. The system 100 of claim 1 comprising two spring-loaded cord spools 140.

6. The system 100 of claim 1 comprising three spring-loaded cord spools 140.

7. The system 100 of claim 1 comprising four spring-loaded cord spools 140.

8. The system 100 of claim 1 further comprising a sanitizer box 210 having an open top, an inner cavity 218 of the sanitizer box 210 is adapted to hold a clipper head 105a of a clipper 105.

9. An organizing system 100 for an electrical clipper 105, said system 100 consisting of:
   (a) a housing 110 having side walls, a top surface 115, a bottom surface 116, and an inner cavity 118, the top surface 115 is removably attached to at least one side wall via an attachment means;
   (b) a spring-loaded cord spool 140 disposed in the inner cavity 118 of the housing 110, the spring-loaded cord spool 140 consisting of an axle 114 around which a cord 104 of a clipper 105 can be wrapped, a bottom end of the axle 114 removably engages a spool mounting component 150 disposed in the bottom surface 116 of the housing 110, the spring-loaded cord spool 140 can rotate in a first direction winding the cord 104 and a second direction unwinding the cord 105;
   (c) a cord slot 180 disposed in a first side wall 111 of the housing 110, the cord slot 180 extends from a top edge 111a of the first side wall 1H downwardly toward the bottom surface 116 of the housing 110, the cord slot 180 allows a cord 104 of a clipper 105 to penetrate the housing 110;
   (d) a release button 240 is disposed on a top end of the axle 144 of the spring-loaded cord spool 140, when the release button 240 is pressed the spring-loaded cord spool 140 rotates in the first direction so as to wind the cord 104 of the clipper 105;

(e) a button hole 128 disposed in the top surface 115 of the housing 110, the button hole 128 is aligned with the release button 240 of the spring-loaded cord spool 140, the release button 240 protrudes through the button hole 128; and (f) a power strip 160 disposed in the inner cavity 118 of the housing, the power strip 160 has a power strip cord 166 that protrudes through the housing 110.

* * * * *